United States Patent [19]

Yamamoto et al.

[11] Patent Number: 5,594,591
[45] Date of Patent: Jan. 14, 1997

[54] PRISM SYSTEM AND A LIQUID CRYSTAL PROJECTION DEVICE

[75] Inventors: Hideki Yamamoto; Naruhiko Atsuchi, both of Tokyo, Japan

[73] Assignee: Pioneer Electronic Corporation, Tokyo, Japan

[21] Appl. No.: 595,238

[22] Filed: Feb. 1, 1995

[51] Int. Cl.⁶ .................................................. G02F 1/1335
[52] U.S. Cl. .................................................. 349/5; 349/117
[58] Field of Search .................. 359/40, 73; 356/401; 250/548

[56] References Cited

U.S. PATENT DOCUMENTS

| | | | |
|---|---|---|---|
| 5,124,841 | 6/1992 | Oishi | 359/487 |
| 5,130,826 | 7/1992 | Takanashi et al. | 359/40 |
| 5,221,982 | 6/1993 | Faris | 359/73 |
| 5,446,510 | 8/1995 | Mitsutake et al. | 359/40 |
| 5,459,593 | 10/1995 | Ootaki | 359/65 |

FOREIGN PATENT DOCUMENTS 57-155516  9/1982  Japan ...................... 359/40

*Primary Examiner*—William L. Sikes
*Assistant Examiner*—Tiep H. Nguyen
*Attorney, Agent, or Firm*—Nikaido, Marmelstein, Murray & Oram LLP

[57] ABSTRACT

A dichroic mirror is formed on a surface of a prism except an incident surface for reflecting an entered ray having a predetermined wavelength. An optical thin film is formed on the incident surface as to totally reflect the ray reflected from the dichroic mirror. The optical thin film has a phase control function.

7 Claims, 4 Drawing Sheets

LINEARLY POLARIZED
LIGHT

CIRCULARLY POLARIZED
LIGHT

PRISM SYSTEM AND A LIQUID CRYSTAL PROJECTION DEVICE

BACKGROUND OF THE INVENTION

The present invention relates to a prism system and a liquid crystal projection device, and more particularly to the prism system which is operated fur totally reflecting incident rays of light or for reflecting a ray of light having a predetermined wavelength.

FIGS. 7a and 7b show a conventional prism system where the light going through a prism is reflected to be emerged in a different direction from the incident light.

The system comprises a triangular prism I made of solid glass and having an incident surface 1a, a reflecting surface 1b and an emerging surface 1c. On the reflecting surface 1b, a dichroic mirror 2 is formed by deposition. The dichroic mirror 2 is a multi-layer film comprising a high refractive index layer and a low refractive index layer each of which has a predetermined thickness end alternatively layered in order. The dichroic mirror has spectral characteristics and polarizing characteristics.

A ray of light enters the prism 1 approximately a right angle to the incident surface The light entered at the incident surface 1a goes through the prism 1 and strikes the reflecting surface 1b. the dichroic mirror 2 reflects light of predetermined wavelength component included in entered light and passes light beams of the other components. For example, one of red (R), green (G) and blue (B) components is reflected from the mirror and two others transmit through the mirror.

The light reflected from the dichroic mirror 2 goes through the prism 1 and strikes the incident surface 1a. The light is again totally reflected from the surface 1a and emerges from the emerging surface 1c.

In such a system, the spectral characteristics the light, namely the characteristics for reflecting and transmitting a desired wavelength component of the incident light is controlled through the dichroic mirror by varying the thickness and the number of layers of the mirror.

Furthermore, it is necessary to control the phase characteristics of the light. Since the transmittance of the S polarized light of the light passing through he multi-layer of the optical thin film is different from that of the P polarized light, a phase difference occurs between the incident light and the reflecting light, making characteristics different in polarized condition.

For example, in a liquid crystal projection device, luminous intensity of light is modulated by a liquid crystal panel, and the light id applied to a projection lens through a prism system. In the device, since light beams emitted from a light source and entered in the prism system are not completely parallel, a part of the rays modulated by the panel is not applied to the projection lens through the prism system. Therefore, the luminance of the light projected on a screen is insufficient.

Accordingly, the dichroic mirror of the prism system is further arranged to have a phase control characteristic so as to completely apply the light passing through the liquid crystal panel to the lens.

Thus, the dichroic mirror of the prism system controls the phase characteristics as well as the spectral characteristics. However, it is necessary to increase the number of layers or provide an additional control layer.

As a result, problems arise on difficulties in controlling the dichroic mirror and manufacturing the thickness of the layer.

SUMMARY OF THE INVENTION

An object of the present invention is to provide a prism system and a liquid crystal projection device where spectral characteristics and phase characteristics of the light can be easily controlled.

According to the present invention, there is provided a prism system having a prism comprised of a dichroic mirror formed on a surface of the prism except an incident surface for reflecting an entered ray having a predetermined wavelength so as to travel in the prism toward the incident surface, an optical thin film formed on the incident surface so as to totally reflect the ray reflected from the dichroic mirror.

The optical thin film has a phase control function.

In another aspect of the invention, the prism system comprises a first prism having a first reflecting surface, and a first incident surface which an incident ray including R, G and B components strikes, a first dichroic mirror formed on the first reflecting surface for transmitting two components in the R, G and B components, and for reflecting the other component so as to travel in the first prism toward the first incident surface, a first optical thin film formed on the first incident surface so as to totally reflect the other component reflected from the first dichroic mirror, a second prism having a second reflecting surface and a second incident surface which the two components transmitted through the first dichroic mirror strike, a second dichroic mirror formed on the second reflecting surface for transmitting one of the two components, and for reflecting the other component so as to emerge the other component from the second prism, a second optical thin film formed on the second incident surface so as to totally reflect the other component reflected from the second dichroic mirror, each of the first and second optical thin films having a phase control function.

The other objects and features of this invention will become understood from the following description with reference to the accompanying drawings.

Figure 3:
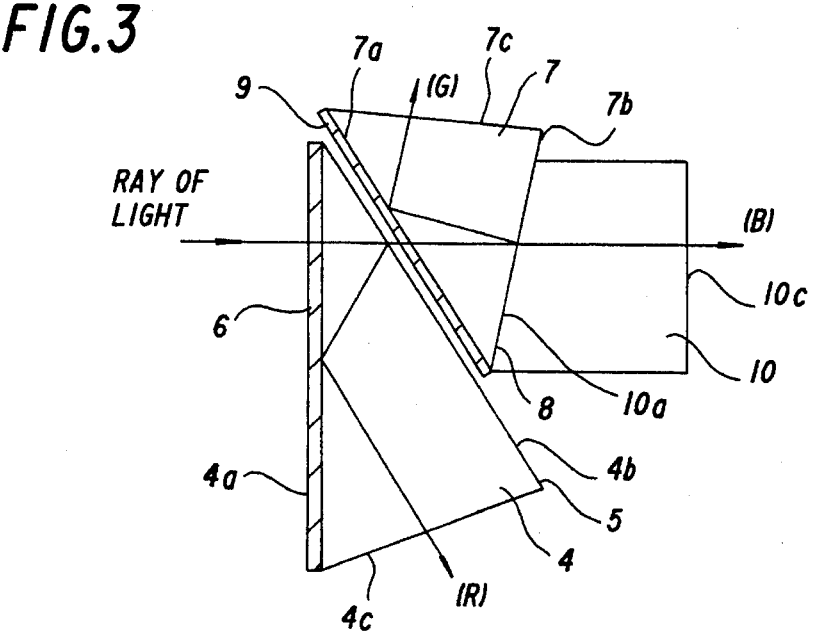
FIG. 3 is a side view showing another embodiment of the prism system of the present invention.
Figure 5:
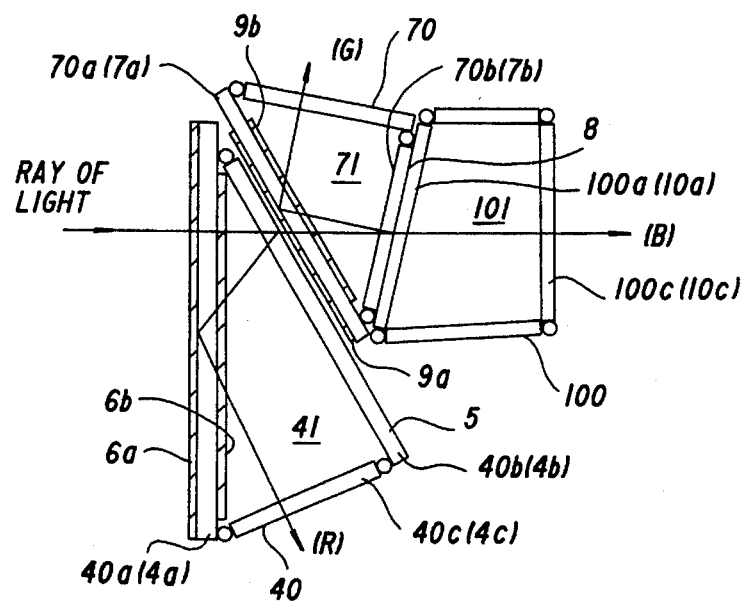
Figure 6:
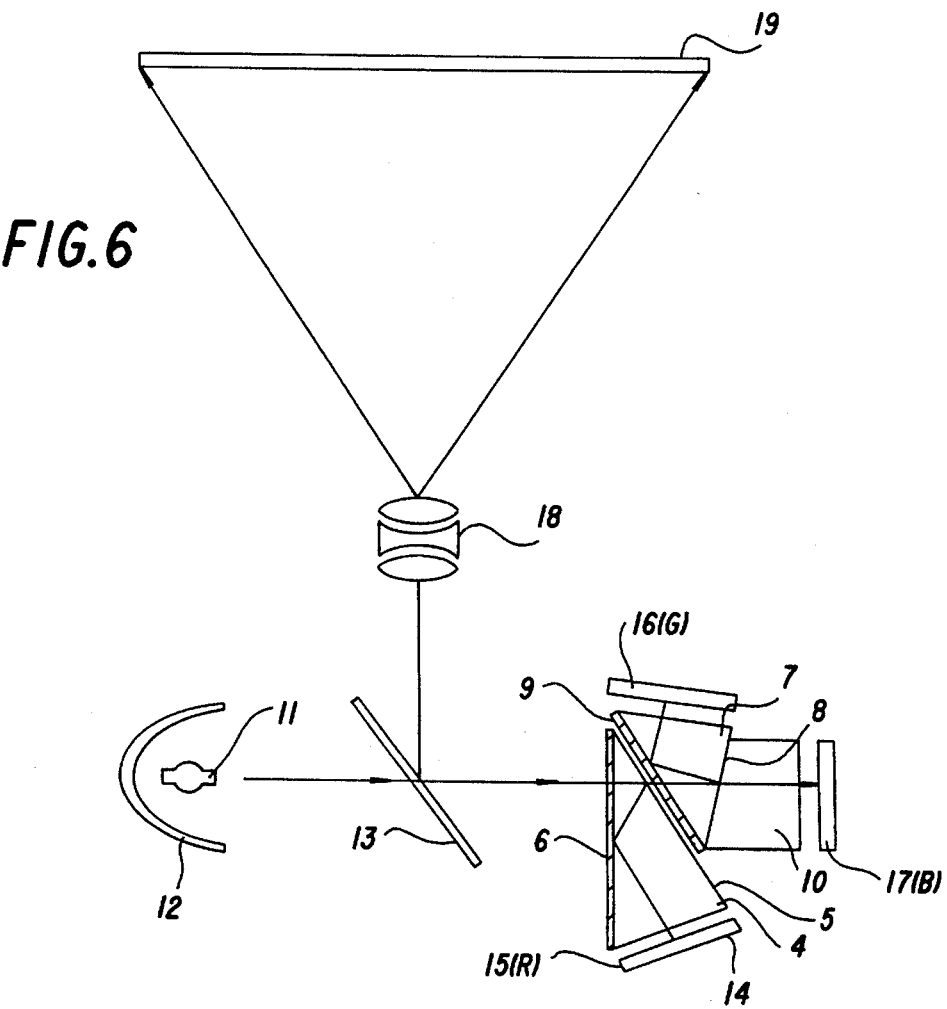
Figure 7A:
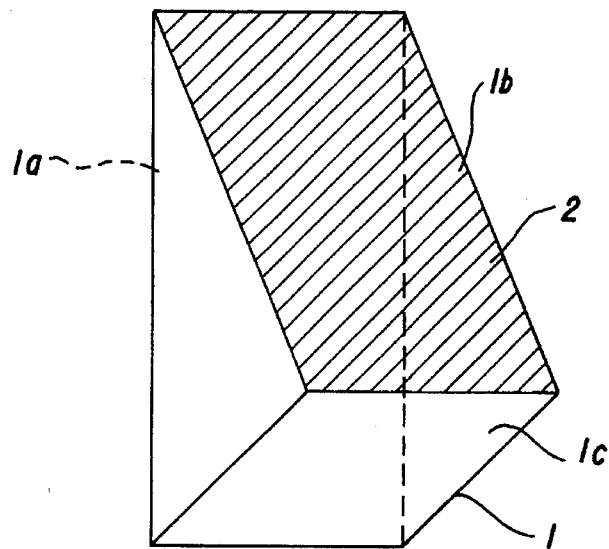

FIGS, 4a, 4b and 4c are perspective views showing the prism system of FIG. 3;

FIG. 5 is a side view showing a further embodiment of the present invention;

FIG. 6 is a diagram showing a liquid crystal projection device to which the present invention is applied;

FIG. 7a is a perspective view of a conventional prism system; and

Figure 7B:
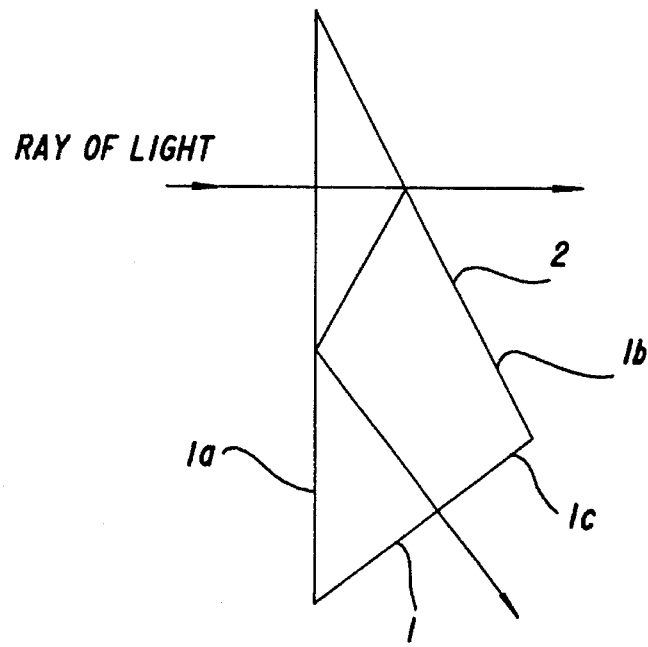

FIG. 7b is a side view of the conventional prism system.

DETAILED DESCRIPTION OF THE PREFERRED EMBODIMENTS

Figure 1A:
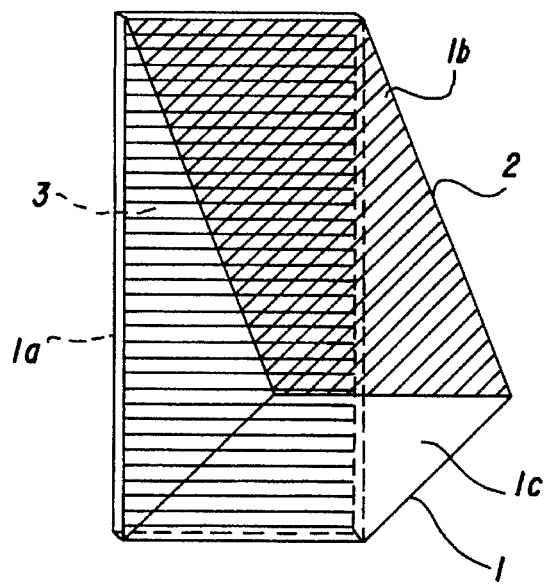
FIG. 1a is a perspective view showing a prism a prism system of the present invention.
Figure 1B:
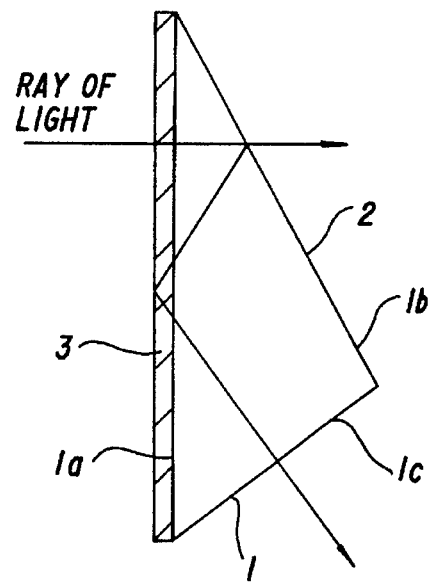
FIG. 1b is a side view of the prism system.

Referring to FIGS. 1a and 1b showing a prism system as an embodiment of the present invention, parts which are the same as the conventional one are identified with the same reference numerals as FIGS. 7a and 7b.

The incident surface 1a of the prism 1 has an optical thin film 3 deposited thereon for preventing incident rays entering the prism from reflecting and for controlling the phase characteristics which will be described hereinafter.

The optical thin film 3 is a multi-layer film layered by vacuum deposition. The layers are deposited so as to adjust refractive index, and construction and thickness of the film. Conditions of the film 3 are shown in an example 1 of a table 1. The film 3 is formed by a multi-layer using from 1st to 8th layers or from 1st to 5th layers. In the table 1, the low refractive index film is SiO$_2$ and the high refractive index film is TiO$_2$.

In operation, when the light strikes the incident surface 1a of the prism 1, the optical thin film 3 acts to prevent reflection from the incident surface. In the same manner as the conventional prism of FIG. 7a, the light travels through the prism 1 and strikes the dichroic mirror 2 which reflects the light of a predetermined wavelength and transmits the other rays.

The light reflected from the dichroic mirror 2 travels through the prism 1 and passes through the incident surface 1a. Then, the light goes through the optical thin film 3 deposited on the surface 1a, and is totally reflected from the film. The reflected light emerges from the emerging surface 1c.

The control of the phase characteristic by the thin film 3 will be described with reference to FIGS. 2a and 2b.

Figure 2A:
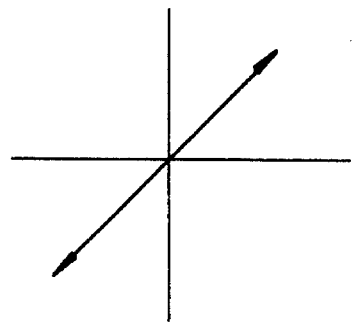
FIGS. 2a and 2b are diagrams showing phase characteristics of the prism system.
Figure 2B:
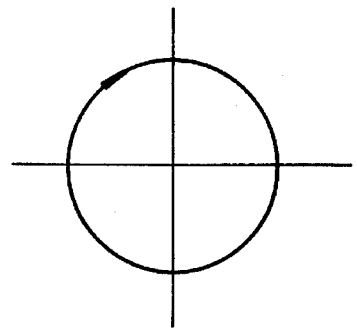

The light reflected from the dichroic mirror 2 is for example, linearly polarized by the mirror as shown in FIG. 2a because the P polarized light and the S polarized light are in phase. When the light travels. through the optical thin film 3 and is reflected, difference in optical path length arises, because of the difference of the transmittance between the S polarized light and the P polarized light. As result, a phase difference is made between the incident light and the reflecting light with respect to the optical thin film 3. Consequently, the reflected light becomes an elliptically or circularly polarized light as shown in FIG. 2b.

Thus, the phase characteristics can be easily controlled through the thin film 3, thereby reducing the number of layers and improving productivity thereof.

By adjusting and changing the thickness, the number or the components of layers of the film 3, and the phase characteristics can be controlled.

Figure 4A:
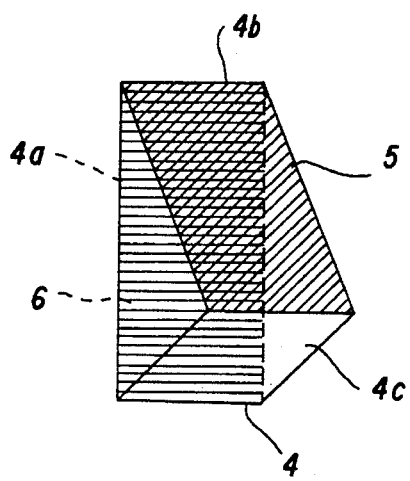
Figure 4B:
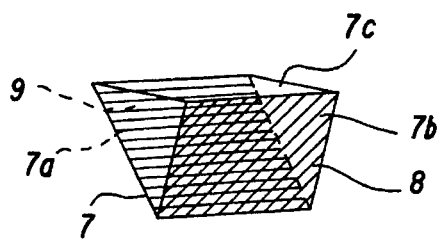
Figure 4C:
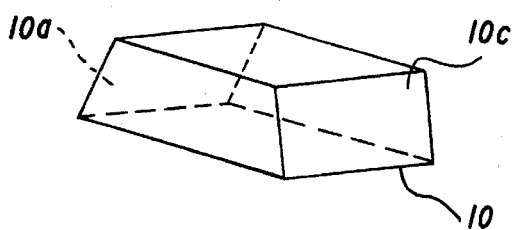

Referring to FIGS. 3 and 4 showing another embodiment of the present invention, a prism comprising three prisms is provided for separating a ray of white light into three primary colors R, G and B.

The prism system comprises a first triangular prism 4, a second triangular prism 7 and a third quadrangular prism 10. Each of the prisms is made of solid glass.

The first triangular prism 4 has an incident surface 4a, a reflecting surface 4b and an emerging surface 4c. A dichroic mirror 5 is formed on the reflecting surface 4b for reflecting the component R and for transmitting the other components G and B. The dichroic mirror 5 is a multi-layer film comprising a high refractive index layer and a low refractive index layer each of which has a predetermined thickness and alternately layered in order. An optical thin film 6 is formed on the incident surface 4a for preventing the light striking the incident surface from reflecting and for controlling the phase characteristics. The light enters the prism approximately at a right angle.

The second triangular prism 7 has an incident surface 7a, a reflecting surface 7b and an emerging surface 7c. A dichroic mirror 8 is formed on the reflecting surface 8b for reflecting the component G and for transmitting the component B. An optical thin film 9 is formed on the incident surface 7a for preventing the reflection of the light entering the prism and for controlling the phase characteristics.

The incident surface 7a of the prism 7 is disposed adjacent the reflecting surface 4b of the first prism 4 so that the light transmitted through the dichroic mirror 5 on the reflecting surface 4b is applied to the prism 7. A gap is formed between the reflecting surface 4b (dichroic mirror 5) of the first prism 4 and the incident surface 7a (optical thin film 9) of the second prism 7 for interposing air there-between.

The third quadrangular prism 10 has an incident surface 10a and an emerging surface 10c. The incident surface 10a is mounted on the reflecting surface 7b of the second prism 7 so that the light, of the component G transmitted through the dichroic mirror 8 is applied to the third prism 10. The reflecting surface 7b (dichroic mirror 8) of the second prism 7 is adhered to the incident surface 10a of the third prism 10 without gap.

In operation, the white light entered the first prism 4 from the incident surface 4a at a right angle travels through the prism 4 and strikes the reflecting surface 4b. The dichroic mirror 5 reflects the component R and transmits the components G and B.

The component R reflected from the dichroic mirror 5 goes through the prism 4 and strikes the incident surface 4a. Then, the component R travels through the optical thin film 6 formed on the surface 4a. The component R is totally reflected from the film 6 and emerges from the emerging surface 4c.

The components G and B passed through the dichroic mirror 5 enter the second prism 7 from the incident surface 7a and strikes the reflecting surface 7b. The dichroic mirror 8 reflects the component G and transmits the component B.

The component G reflected from the dichroic mirror 8 travels through the prism 7 and strikes the incident surface 7a. Between the first prism 4 and the second prism 7, the air gap is provided. Since the refractive index of the glass is larger than that of the air, the component G going through the optical thin film 9 is totally reflected therefrom. The reflected component G goes through the prism 7 and emerges from the emerging surface 7c.

The component B passed through the dichroic mirror 8 enters the third prism 10, goes through the prism 10 and emerges from the emerging surface 10c.

In the embodiment, by controlling the thickness and the number of layers of the dichroic mirrors 5 and 8, the spectral characteristics of the components R and G are controlled.

Since the optical thin films 6 and 9 are provided, the light entered the prisms 4 and 7 is prevented from reflecting from the incident surfaces 4a and 7a and the phase characteristics of the components R and G are controlled.

FIG. 5 shows a further embodiment of the spectral prism system for three primary colors.

The prism system comprises first, second and third prisms 40, 70 and 100, similar to the previous embodiment of FIG. 3. Each of the prisms in formed by a plurality of glass plates assembled into a predetermined shape.

The first prism 40 comprises glass plates 40a, 40b and 40c to form incident surface 4a, reflecting surface 4b and emerging surface 4c, respectively. The second prism 70 has incident surface 7a, reflecting surface 7b and emerging surface 7c formed by glass plates 70a, 70b and 70c. The third prism 100 comprises glass plates 100a and 100c to form incident surface 10a and emerging surface 10c, respectively.

A gap is formed between the glass plate 40b and 70a. The glass plate 70b is adhered to the glass plate 100a.

In each of the prisms 40, 70 and 100, a space is formed by the glass plates. The spaces are filled with liquid 41, 71 and 101, respectively, to form liquid filled prisms. As the liquid, one of ethylene glycol, glycerol, silicone oil, and benzylic alcohol or a mixture of at least two liquid is employed.

On the glass plates 40b and 70b for the reflecting surfaces 4b and 7b of the first and second prism 40 and 70, dichroic mirrors 5 and 8 are formed, respectively.

On the glass plate 40a for the incident surface 4a, optical thin films 6a and 6b are formed on an outer side and an inner side, respectively. On the glass plate 70a for the incident surface 7a, optical thin films 9a and 9b are formed on an outer side and an inner side, respectively.

In operation, similar to the previous embodiment of FIG. 3, the white light entered from the incident surface 4a on the glass plate 40a goes through the liquid 41 and strikes the reflecting surface 4b on glass plate 40b. The dichroic mirror 5 reflects the component R end transmits the components G and B.

The component R reflected from the dichroic mirror 5 goes through the liquid 41 and strikes the incident surface 4a. Then, the component R travels through the inner optical thin film 6b, glass plate 40a and outer optical thin film 6a and is totally reflected therefrom. The reflected light goes through the liquid 41 and emerges from the emerging surface 4c on the glass plate 40c.

The components G and B passed through the dichroic mirror 5 enter the second prism 70, travel through the liquid 71 and strike the reflecting surface 7b on the glass plate 70b. The dichroic mirror 8 reflects the component G and transmits the component B.

The component G reflected from the dichroic mirror 8 goes through the liquid 71 and strikes the incident surface 7a. The component G goes through the inner optical thin film 9b, glass plate 70a and outer optical thin film 9a and is totally reflected therefrom. The reflected component G goes through the liquid 71 and emerges from the emerging surface 7c.

The component B passed through the dichroic mirror 8 enters the third prism 100, goes through the liquid 101 and emerges from the emerging surface 10c.

In the embodiment, since two optical this films 6a and 6b, 9a and 9b are formed on both sides of the glass plates 40a and 70a, respectively, the phase characteristics are more precisely controllable.

Conditions of the outer films 6a and 9a are shown in an example 2 of table 1. Each film is formed by a multi-layer employing from 1st to 8th layers or from 1st to 5th layers.

An example 3 of table 1 shows conditions of the inner films 6b and 9b. Each film is formed by a multi-layer using from 1st to 7th layers or from 1st to 5th layers.

FIG. 6 shows a liquid crystal projection device employed with the prism system of FIG. 3.

The device comprises a light source 11 for the white light such as a halide lamp or xenon lamp, a reflector 12 for reflecting beams emitted from the light source 11 in parallel, and a prism 13 applied with the while light from the reflector 12. A spectral prism system 14 comprising three prisms 4, 7 and 10 of FIG. 3 is applied with the P polarized light passed through the prism 13. Three liquid crystal reflection panels 15, 16 and 17 are provided of the prisms 4, 7 and 10, respectively, adjacent to the emerging surfaces thereof. A projection lens 18 and a screen 19 are further provided.

In operation, the white light emitted from the white light source 11 is reflected on the reflector 12 so as to arrange the light in parallel which is applied to the prism 13. The prism 13 passes through the P polarized light of the white light and reflects the S polarized light. The P polarized ray strikes the incident surface 4a of the first prism 4 of the prism system 14.

The prism system 14 effects the same function as hereinbefore described. Thus, the P polarized light is separated into three components R, G end B which emerge from the emerging surfaces 4c, 7c and 10c, respectively.

The component R is applied to the reflection type liquid crystal panel 15, the component G is applied to the reflection type liquid crystal panel 16 and the component B is applied to the reflection type liquid crystal panel 17. Each panel modulates the incident ray in luminous intensity in accordance with a predetermined signal (for example television color video signal) which corresponds to one of three primary colors R, G and B. Each of the modulated components transmits the panel and is reflected from a reflector (not shown) in the panel and passes through the panel, so that the P polarized light is converted into the S polarized light.

The components again enter the prism system 14 at the emerging surfaces 4c, 7c and 10c, respectively. In the prism system, the components are optically synthesized in reverse manners and applied to the prism 13. The prism 13 reflects the synthesized S polarized ray to the projection lens 18. The projection lens 18 expands the light to be projected on the screen 19, thereby displaying an image.

It is desirable that the reflector 12 emits a parallel ray. However, the ray reflected from the reflector 12 is not completely arranged in parallel. The ray may be somewhat expanded or contracted in tapered shape. Such a ray is not completely converted into an S polarized ray. Namely, the whole of the P polarized ray from the prism 13 is converted into the S polarized light. Therefore a P polarized ray is included in the optically synthesized ray. The remaining P polarized ray transmits the prism 13. Accordingly, the luminance of the ray projected on the screen 19 is reduced, which causes the efficiency of the display to reduce.

In the device of the present invention, the optical thin films 6 and 9 are provided in the prism system 14 for controlling the phase of the reflected light, so that the panels 15, 16 and 17 may entirely convert the incident ray into the S polarized light. Thus, the components RGB synthesized by the prism system 14 is entirely reflected from the prism 13 to the projection lens 18 without transmitting the prism.

As the spectral prism system 14, liquid filled prisms of FIG. 5 may be employed. A liquid filled prism may also be employed for the prism 13.

In place of the liquid crystal panels 15, 16 and 17 of reflection type, panels of transmission type may be used. In this case, a prism is provided besides the prism system 14 for optically synthesizing the luminance modified components R, G and B, and for introducing synthesized ray to the projection lens 18.

In accordance with the present invention, spectral characteristics and phase characteristics can be easily controlled.

Furthermore, in the liquid crystal projection device, the utilization efficiency of the light is increased, thereby improving the luminance.

While the presently preferred embodiments of the present invention has been shown and described, it is to be understood that these disclosures are for the purpose of illustration and that various changes and modifications may be made without departing from the scope of the invention as set forth in the appended claims.

TABLE 1

| FILM LAYER | COMPONENT OF FILM | REFRACTIVE INDEX | THICKNESS OF FILM (nanometer) |
|---|---|---|---|
| | | EXAMPE 1 | |
| | AIR | | |
| 1 | L | 1.460000 | 103.18493 |
| 2 | H | 2.230550 | 24.66656 |
| 3 | L | 1.460000 | 63.70548 |
| 4 | H | 2.230550 | 18.79357 |
| 5 | L | 1.460000 | 56.07877 |
| 6 | H | 2.230550 | 36.70619 |
| 7 | L | 1.460000 | 37.68493 |
| 8 | H | 2.230550 | 18.79357 |
| | PRISM 1 | | |
| | | EXAMPLE 2 | |
| | AIR | | |
| 1 | L | 1.455053 | 97.52224 |
| 2 | H | 2.235483 | 23.08226 |
| 3 | L | 1.455053 | 64.71931 |
| 4 | H | 2.235483 | 18.75434 |
| 5 | L | 1.455053 | 55.41037 |
| 6 | H | 2.235483 | 36.06603 |
| 7 | L | 1.455053 | 35.46263 |
| 8 | H | 2.235483 | 20.19698 |
| | GLASS 40a, 70a | | |
| | | EXAMPLE 3 | |
| | GLASS 40a 70a | | |
| 1 | H | 2.539014 | 11.18544 |
| 2 | L | 1.473078 | 66.51381 |
| 3 | H | 2.539014 | 22.51381 |
| 4 | L | 1.473078 | 55.98222 |
| 5 | H | 2.539014 | 22.65053 |
| 6 | L | 1.473078 | 66.51381 |
| 7 | H | 2.530914 | 11.18544 |
| | PRISM 40, 70 | | |

COMPONENT OF FILM
L: LOW REFRACTIVE INDEX FILM
H: HIGH REFRACTIVE INDEX FILM

What is claimed is:

1. A prism system having a prism comprising:

a dichroic mirror formed on a surface of the prism except an incident surface for reflecting an entered ray having a predetermined wavelength so as to travel in the prism toward the incident surface;

an optical thin film formed on the incident surface so as to totally reflect the ray reflected from the dichroic mirror, the optical thin film having a phase control function.

2. The prism system according to claim 1 wherein the optical thin film comprises a plurality of layers.

3. The prism system according to claim 2 wherein the layers comprise a low refractive index film of $SiO_2$ and a high refractive index film of $TiO_2$.

4. A prism system comprising:

a first prism having a first reflecting surface, and a first incident surface which an incident ray including R, G and B components strikes;

a first dichroic mirror formed on the first reflecting surface for transmitting two components in the R, G and B components, and for reflecting the other component so as to travel in the first prism toward first incident surface;

a first optical thin film formed on the first incident surface so as to totally reflect said other component reflected from the first dichroic mirror;

a second prism having a second reflecting surface and a second incident surface which said two components transmitted through the first dichroic mirror strike;

a second dichroic mirror formed on the second reflecting surface for transmitting one of said two components, and for reflecting the other component so as to emerge the other component from the second prism;

a second optical thin film formed on the second incident surface so as to totally reflect said other component reflected from the second dichroic mirror;

each of the first and second optical thin films having a phase control function.

5. The prism system according to claim 4 wherein at least one of the first and second prisms is formed by glass plates so as to form a space therein, the optical thin film is formed on both surfaces of a glass plate for the incident surface, the space is filled with liquid.

6. A liquid crystal projection device comprising:

a first prism having a first reflecting surface, end a first incident surface which an incident ray including R, G and B components strikes;

a first dichroic mirror formed on the first reflecting surface for transmitting two components in the R, G and B components, and for reflecting the other component so as to travel in the first prism toward the first incident surface;

a first optical thin film formed on the first incident surface so as to totally reflect said other component reflected from the first dichroic mirror;

a second prism having a second reflecting surface and a second incident surface which said two components transmitted through the first dichroic mirror strike;

a second dichroic mirror formed on the second reflecting surface for transmitting one of said two components, and for reflecting the other component so as to emerge the other component from the second prism;

a second optical thin film formed on the second incident surface so as to totally reflect said other component reflected from the second dichroic mirror;

each of the first and second optical thin films having a phase control function;

three liquid crystal panels, each of which modulates a corresponding component in luminous intensity in accordance with a signal for the component;

means for optically synthesizing the components modified by the liquid crystal panels to a synthesized ray; and a screen to which the synthesized ray is projected.

7. The liquid crystal projection device according to claim 6 wherein at least one of the first and second prisms is formed by glass plates so as to form a space therein, the optical thin film is formed on both surfaces of a glass plate for the incident surface, the space is filled with liquid.

* * * * *

UNITED STATES PATENT AND TRADEMARK OFFICE
CERTIFICATE OF CORRECTION

PATENT NO. : 5,594,591
DATED : January 14, 1997
INVENTOR(S) : Yamamoto et al.

It is certified that error appears in the above-indentified patent and that said Letters Patent is hereby corrected as shown below:

On the title page:

Item [22], delete " Filed: Feb. 1, 1995 " insert therefor -- Filed: Feb. 1, 1996 --

Item [30], insert therefor -- Foreign Application Priority Data No. 7-37602; Country Japan; Date February 2, 1995 --.

Signed and Sealed this

Twenty-ninth Day of April, 1997

Attest:

BRUCE LEHMAN

*Attesting Officer*  *Commissioner of Patents and Trademarks*